Sept. 1, 1964  D. T. AYERS, JR  3,146,679
FLUID PRESSURE MOTOR MECHANISM
Filed Nov. 4, 1963
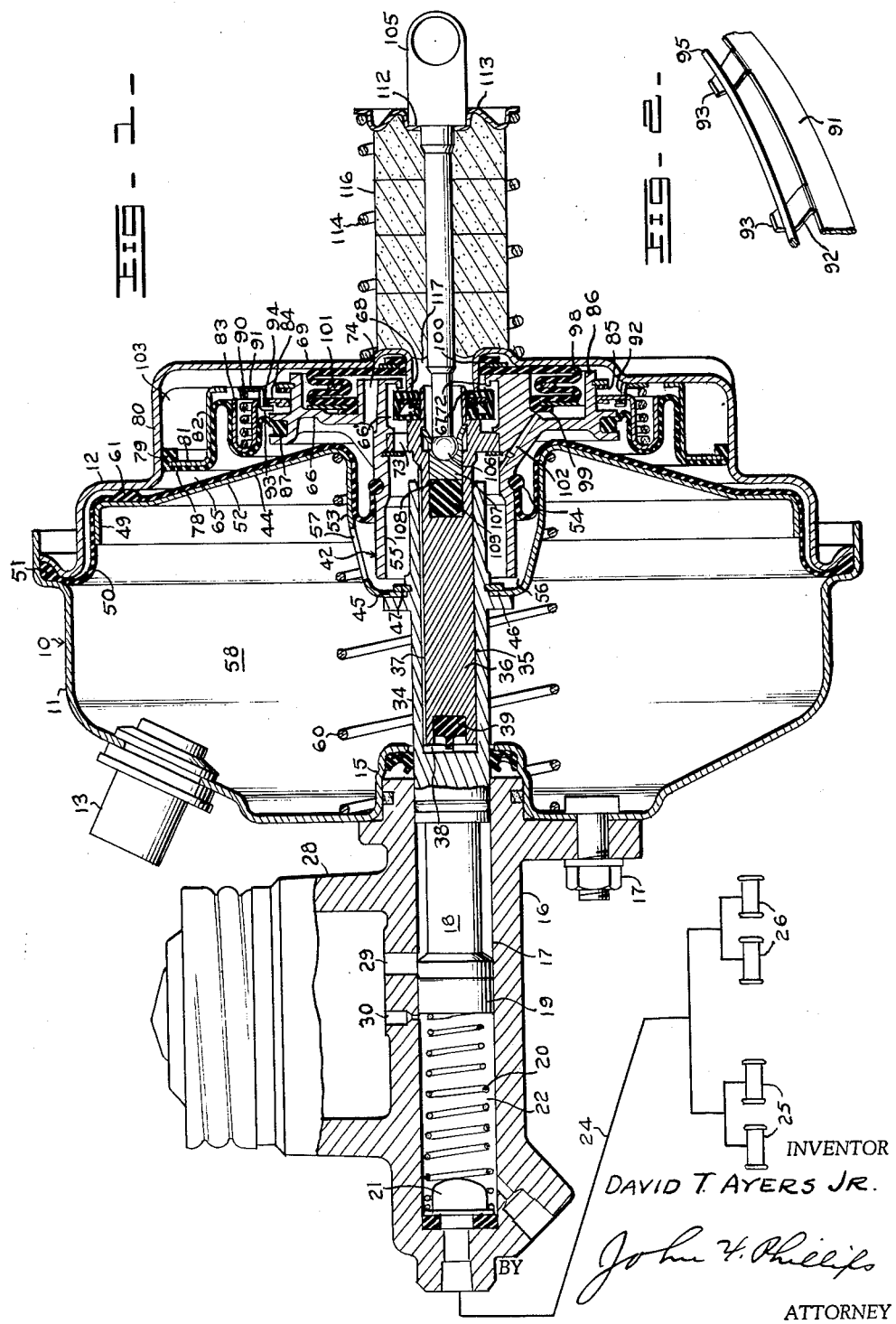
INVENTOR
DAVID T. AYERS JR.
BY
John F. Phillips
ATTORNEY 3,146,679
FLUID PRESSURE MOTOR MECHANISM
David T. Ayers, Jr., Birmingham, Mich., assignor to Kelsey-Hayes Company, Romulus, Mich., a corporation of Delaware
Filed Nov. 4, 1963, Ser. No. 321,165
12 Claims. (Cl. 91—391)

This invention relates to a fluid pressure motor mechanism, and particularly to a fluid pressure motor for operating the hydraulic brakes of a motor vehicle.

As is well-known, booster motors have been used for a number of years for operating vehicle brakes, these motors being of such nature that depression of the brake pedal operates a valve mechanism to energize the motor, and the force of the brake pedal is utilized for assisting the motor in generating master cylinder pressures. More recently, motor mechanisms have been developed which provide for the full power operation of the brakes of a motor vehicle in which the brake pedal normally performs only the function of operating the valve mechanism of the motor. The brake pedal is thus caused to partake of very slight movement from a normal off position to a fully applied brake position. Such a mechanism usually provides means for reacting against the brake pedal with a force proportional to hydraulic braking pressures so that the operator "feels" the extent to which the brakes are being operated. Moreover, these mechanisms provide for operation of the master cylinder plunger in the event of a power failure so that the brakes can be foot-operated when no vacuum or super-atmospheric pressure is present, depending upon the type of motor.

An important object of the present invention is to provide a motor mechanism wherein all of the force necessary for operating the brakes is generated by the motor, and wherein the parts have been greatly simplified and reduced in number to render more economical the manufacture and assembling of the motor.

A further object, more specifically, is to provide a unitary member forming the initial reaction element and the valve carrier, thus simplifying the motor to an appreciable extent.

A further object is to provide a unit of this character in a brake operating motor which is wholly supported and aligned by the power piston without any sliding connection with the motor casing or any other elements of the motor mechanism.

A further object is to provide in conjunction with such unit a novel type of secondary reaction device which increases brake pedal reaction after the motor has been energized to an appreciable extent.

A further object is to additionally simplify the motor by providing a novel type of valve mechanism including a stationary valve seat formed on and as a part of the motor casing.

A further object is to provide such a novel mechanism wherein the unit referred to is pedal-operable to effect operation of the master cylinder plunger in the event of a failure in power in the source.

Other objects and advantages of the invention will become apparent during the course of the following description.

In the drawing I have shown one embodiment of the invention. In this showing

FIGURE 1 is a sectional view through the motor mechanism, the pedal being omitted, the vehicle wheel cylinders being diagrammatically represented, and FIGURE 2 is a detail fragmentary prospective view of a portion of the counter-reaction spring seat.

Referring to FIGURE 1, numeral 10 designates a motor casing as a whole comprising co-axial sections 11 and 12, the former of which is provided with a fitting 13 connected to a source of vacuum. It will be apparent that super-atmospheric pressure may be used as a source of power instead of atmospheric pressure.

The casing section 11 is provided with an inwardly extending axial hub portion 15 in which is arranged the rear end of a master cylinder 16 secured as at 17 to the casing section 11. The master cylinder per se may be conventional and has a bore 17 therein in which is slidable the usual plunger 18 having a cup 19. The plunger 18 is urged rearwardly by a spring 20 which also engages a conventional residual pressure valve 21. The plunger 18 is movable to the left to generate hydraulic pressure in the chamber 22. Such fluid is displaced past the valve 21 through lines 24 to the front and rear wheel cylinders 25 and 26, respectively. The master cylinder has the usual reservoir 28 communicating with the bore 17 through ports 29 and 30, the former communicating back of the head of the plunger 18 with the bore 17 and the port 30 communicating with the chamber 22 just ahead of the seal 19 in the usual manner.

The plunger 18 is provided with a rearwardly extending sleeve portion 34 having a bore 35 in which is slidable the forward end of a pilot stem 36, preferably having a small longitudinal groove 37 to prevent the generation of pressure in the small chamber 38 at the forward end of the stem 36. The forward end of such stem carries a rubber bumper 39 to cushion engagement of the stem 36 with the forward end of the bore 35 under conditions to be described.

The pilot stem 36 is part of a unit 42 which carries the valve mechanism for the motor and is provided with the initial reaction surface to oppose movement of the brake pedal when the motor is energized, thus providing the pedal with reaction force. It will be apparent that the unit 42 is wholly supported and maintained in axial alignment with the motor by engagement of the stem 36 in the bore 35.

A stamped plate 44, shaped as shown in FIGURE 1, is provided with an inner annular flange 45 engaging a flange 46 on the tubular extension 34 and maintained in position by a snap ring 47. The outer periphery of the plate 44 is provided with a cylindrical flange 49 around which extends a rolling diaphragm 50 beaded at its outer periphery as at 51 to be clamped between the casing sections 11 and 12. The diaphragm 50 extends inwardly over an intermediate conical portion 52 of the plate 44, thence within a forwardly extending plate portion 53, the inner periphery of the diaphragm 50 having a bead 54 anchored to a generally cylindrical wall 55 of the unit 42. This wall 55 is arranged in a chamber 56 in fixed communication through an opening 57 with a fixed pressure chamber 58 in which vacuum is always maintained through the fitting 13. The plate 44, diaphragm 50 and sleeve 34 constitute the pressure responsive unit of the motor, and such unit is normally maintained in off position by a return spring 60. Movement of the pressure-responsive unit to off position is limited by a plurality of bumpers 61 engageable with an adjacent wall of the casing section 12 and formed integral with the diaphragm 50.

To the right of the plate 44 and diaphragm 50 is formed a variable pressure chamber 65 normally communicating with the vacuum chamber 58 and connectible with the atmosphere in a manner to be described to effect movement of the pressure-responsive unit toward the left. The unit 42 had an outwardly extending annular wall 66, the left-hand face of which is exposed to the chamber 65 to provide a reaction surface as will become apparent.

Within the rear portion of the cylindrical wall 55 is formed a chamber 66' in which is arranged a valve 67 spring-biased rearwardly into normal engagement with a stationary valve seat 68 formed integral with the rear wall 69 of the casing section 12, the wall 69 at its inner periphery extending forwardly and terminating in the valve seat 68. Radially outwardly of and concentric with the valve seat 68, the unit 42 is provided with a valve seat 72 normally disengaged from the valve 67. The chamber 66' communicates with the chamber 56 through one or more ports 73. The unit 42 is provided with a passage 74, and the valve 67 being normally disengaged from the seat 72, it will be apparent that the chamber 66' normally communicates through the passage 74 with the variable pressure chamber 65. Thus, vacuum is normally maintained in such chamber.

A rolling reaction diaphragm 78 has an outer bead 79 maintained in tight engagement with the adjacent cylindrical wall portion 80 of the casing section 12 by a flange 81 formed on and extending outwardly from a cylindrical plate 82. The bead 79 is pressed tightly in position in the cylindrical casing wall 80. The diaphragm 78 extends over the inner surface of the cylindrical plate 82, then curves forwardly over a counter-reaction plate 83 having a radially inner wall portion 84 perpendicular to the axis of the motor and normally spaced from a rubber bumper 85 fixed in position with respect to the adjacent cylindrical wall portion 86 of the unit 42. The radially inner periphery of the diaphragm 78 is sealed with respect to the unit 42 by a bead 87.

The plate 83 acts as a seat for the forward end of a counter-reaction spring 90, the rear end of which engages a spring seat 91. This seat has forwardly extending fingers 92 (FIGURE 2) terminating in ends 93 projecting through openings 94 in the flange 84 and a wire or similar ring 95 is arranged between the fingers 93 and flange 84.

Rearwardly of the wall 66 is arranged an accordion diaphragm 98, the forward end of which is sealed relative to the unit 42 by a bead 99, the rear end of which is sealed as at 100 relative to the rear wall 69 of the casing section 12. The center convolution of the diaphragm 98 is prevented from expanding radially outwardly by a reinforcing ring 101, the radially outwardly facing surfaces of the diaphragm being subject to vacuum through a passage 102 formed in the unit 42, the passage also serving to maintain in communication with the source of vacuum a chamber 103 formed to the right of the wall 66 and diaphragm 78.

The unit 42 is movable to the left to effect valve operation by a push rod 105 having connection as at 106 with a slidable head 107 arranged in a bore 108 in the stem 36, a rubber cushion 109 being interposed between the head 107 and the bottom of the bore 108. The push rod 105 is shouldered as at 112 to engage a seat 113, and between this seat and the casing wall 69 is arranged a return spring 114 to bias the push rod 105 to its off position. It will be obvious that the rear end of the push rod 105 is connected to a conventional brake pedal, preferably the depending type. Within the spring 114 and between the seat 113 and the casing wall 86 is arranged an air cleaner 116 preferably formed of readily and highly compressible porous material, such as polyurethane foam. The air cleaner 116 prevents entrance of any foreign material into the air chamber 117 within the valve seat 68.

*Operation*

The parts are shown in their normal positions with the brake pedal (not shown) released. The chambers 58 and 65 communicate with each other through port 57, chamber 56, ports 73, around the valve seat 72 and through passage 66'. The chamber 103 is also subject to vacuum through passage 102. Accordingly, all of the motor chambers are vacuum-balanced. Movement of the spring 90 is limited since it engages at opposite ends against the seat 83 and plate 91, the latter being prevented from separating from the seat 83 by the fingers 93 and ring 95. Atmospheric pressure, of course, will be present in the chamber 117, but will be blocked off from the chamber 66' by engagement of the valve seat 68 with the valve 67.

The device is operated to apply the brakes by depressing the brake pedal in the usual manner to move the push rod 105 to the left in FIGURE 1. This movement effects corresponding movement of the unit 42 to engage the valve seat 72 with the valve 67, whereupon the elements of the valve mechanism will assume lap positions. Slight further movement of the unit 42 causes the valve seat 72 to move the valve 67 from the seat 68, whereupon air will flow around the valve seat 68 through passage 74 to the chamber 65, whereupon differential pressure moves the pressure responsive unit to the left to actuate the master cylinder plunger 18 and displace fluid to the wheel cylinders.

Since there is relatively little resistance to movement of the master cylinder plunger during this initial operation of the motor, the differential pressures in the chambers 58 and 65 will be relatively low. This pressure is insufficient to move the diaphragm 78 to compress the spring 90, but the pressure in the chamber 65 will act on the left-hand face of the wall 66 to oppose movement of the unit 42, thus reacting against the brake pedal to a degree proportional to differential pressures in the chambers 58 and 65. It will be recalled that vacuum is always present in the chamber 103, and accordingly, differential pressures between the chambers 65 and 103 will be the same as between the chambers 65 and 58. The area of the wall 66 exposed to pressure in the chamber 65, however, will be much smaller than the area of the right side of the diaphragm 50 of the pressure-responsive unit.

As soon as initial engagement of the brake shoes with the drums takes place, increased resistance to movement of the master cylinder plunger 18 will occur, and this resistance, of course, affects the diaphragm 50 and retards its movement with the result that there will be a rapid increase in pressure in the chamber 65. Whereas pressure acting against the left-hand face of the wall 66 provided initial reaction for the brake pedal to a relatively low degree, a second stage of reaction will now be provided since pressure acting on the portion of the diaphragm 78 will compress the spring 90. During initial motor operation, the rubber bumper 85 will have moved close to the flange 84 and engagement of these elements takes place upon initial compression of the spring 90. The combined areas of the left-hand side of the wall 66 and of the diaphragm 78 inwardly of the cylindrical wall 82 will now oppose movement of the unit 42 in a second stage of reaction to resist movement of the brake pedal, but this resistance again will be proportional to differential pressures in the motor which, in turn, will be proportional to the hydraulic pressure generated in the master cylinder chamber 22 and in the wheel cylinders 25 and 26.

It will be obvious, of course, that the closing of the valve seat 72 prevents air pressure from reaching the chamber 66', but this pressure will affect the radially inner surfaces of the diaphragm 98, which acts to seal the chamber 103 from the atmosphere. Any appreciable radial expansion of the diaphragm 98 will be prevented by the ring 101.

The motor is so designed as to provide ample power in itself for the full application of the vehicle brakes without asisstance from the operator, and the brake pedal moves only a slight distance to effect the operation of the valve mechanism in a manner described above. If, upon full energization of the motor, additional braking force is desired, the pedal can be further depressed to deliver force through the cushion 109 and stem 36 to the plunger 18, the member 39 cushioning and silencing engagement between the stem 36 and plunger 18. Such circumstance might arise in the making of an emergency or "panic" stop, or if through leakage or other fault in the system, full vacuum is not present in the motor chamber 58. Such full movement of the brake pedal is permitted by the proper selection of the material used in the making of the air cleaner 116, for example, spongy and highly compressible polyurethane.

The brakes are released by releasing the brake pedal, the spring 114 returning the pedal-operated parts to normal off positions opening the valve seat 72 and closing the valve seat 68. All of the motor chambers will again be vacuum-balanced and the plunger 18 and associated parts will be returned to normal position by the springs 20 and 60.

As stated, an increase in pressure in the chamber 58 may occur through leakage in the vacuum system. However, with the parts in normal position, pressures will always be balanced in the chambers 58, 65 and 103. This is also true in the event of a complete failure in power. Under such conditions, atmospheric pressure will be present in the three motor chambers referred to, and the brakes may be manually applied in the same manner as described above by transmitting axial forces straight through the mechanism from the push rod 105 to the master cylinder plunger 18. There being no biasing pressures affecting any of the parts so moved, there will be no resistance to the pedal operation of the brakes, except for the force of the return springs 20, 60 and 114.

The device is simplified over prior constructions by making unitary the unit 42, which includes the valve-carrying elements of the motor and the reaction wall 66. Moreover, through the use of the pilot stem 36, the unit 42 is wholly supported and axially guided by the sleeve portion 34 of the master cylinder plunger without the necessity of providing a bearing in the motor casing.

In prior constructions, moreover, two valve seats have been included in the valve mechanism within the motor. By eliminating a bearing in the motor housing, the inner periphery of the wall 69 in the present case can be turned inwardly to form the valve seat 68, thus further simplifying the construction and rendering its manufacture more economical. The unit 42 therefore performs three functions, namely, its cooperation with the sleeve 34 to support the unit, the use of such unit to support the valve mechanism, and the use of a portion of the same integral unit to provide a surface against which initial reaction is provided, namely, the left side of the wall 66. The unit 42 directly opposes movement of the push rod 105 and of the brake pedal, and cooperates efficiently with the diaphragm 78 and associated elements to provide a second and higher degree of reaction.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A fluid pressure motor mechanism comprising a motor having a casing and a pressure responsive unit provided at one side thereof with a first chamber, an axially movable unit in said casing at the side of said pressure responsive unit opposite said first chamber, said movable unit being supported and axially guided solely by said pressure responsive unit, means connecting said movable unit in sealed relation to said casing and forming with said movable unit and said pressure responsive unit a second chamber, a first valve seat carried by said movable unit, a stationary second valve seat concentric with and spaced within said first valve seat, a manually operable member engaging said movable unit to effect axial movement thereof, and a spring pressed valve carried by said movable unit and normally engaging said second seat and disengaged from said first seat whereby, upon movement of said unit by said manually operable member, said first valve seat will engage said valve and move it from said second valve seat, the space within said second valve seat being connected to a pressure source, the space surrounding said second valve seat communicating with said second chamber to supply pressure thereto when said movable unit is moved, said movable unit having lost motion connection with said pressure responsive unit to effect movement of the latter by said manually operable member upon a failure of said valve mechanism to increase pressure in said second chamber relative to said first chamber.

2. A motor mechanism according to claim 1 wherein said pressure responsive unit is provided with a bore, said movable unit having a pilot stem slidable in said bore whereby said movable unit is supported and guided by said pressure responsive unit.

3. A motor mechanism according to claim 1, wherein said valve seats are at the side of said valve opposite said first chamber, said second valve seat being formed on said casing.

4. A motor mechanism according to claim 1, wherein said valve seats are at the side of said valve opposite said first chamber, said second valve seat being formed on said casing, said manually operable member comprising a rod projecting axially through and in spaced relation to said valve and said second seat, said pressure responsive unit having a sleeve, said movable unit having a pilot stem slidable in said sleeve to support and guide said movable unit.

5. A fluid pressure motor mechanism comprising a motor having a casing and a pressure responsive unit provided at one side thereof with a first chamber, an axially movable unit in said casing at the side of said pressure responsive unit opposite said first chamber and forming with said pressure responsive unit a second chamber, means connected to said movable unit and sealing the latter relative to said casing and forming part of said second chamber, said movable unit and said means forming a third chamber with the end of said casing opposite said first chamber, a first valve seat carried by said movable unit, a second valve seat concentric with and spaced within said first valve seat, a manually operable member engaging said movable unit to effect axial movement thereof, and a spring pressed valve carried by said movable unit and normally engaging said second valve seat whereby, upon movement of said unit by said manually operable member, said first valve seat will engage said valve and move it from said second valve seat, the space within said second valve seat being connected to a pressure source, the space surrounding said second valve seat communicating with said second chamber to supply pressure thereto when said movable unit is moved by said manually operable member, said third chamber being connected to said first chamber, said movable unit having reaction surfaces exposed to said second and third chambers whereby pressure in said second chamber opposes movement of said movable unit by said manually operable member.

6. A motor mechanism according to claim 5 wherein said means comprises a diaphragm having its inner periphery connected to said movable unit, and a counter-reaction spring opposing movement of said diaphragm until pressure in said second chamber reaches a predetermined point whereupon said diaphragm transmits reaction forces to said movable unit.

7. A fluid pressure motor mechanism comprising a motor having a casing and a pressure responsive unit comprising an axial force-transmitting member and means connected between such unit and said casing and forming with one end thereof a first chamber, an axially movable unit in said casing at the side of said pressure responsive unit opposite said first chamber, said movable unit having a radially outwardly projecting annular portion, a diaphragm connecting such portion with said casing and cooperating with said portion to form with said pressure-responsive unit a variable pressure chamber, said force-transmitting member having an axial bore, said movable unit having a pilot stem slidable in said bore to be wholly supported and axially guided thereby, a first valve seat carried by said movable unit, a spring-pressed valve carried by said movable unit and normally disengaged from said valve seat, a second valve seat formed on said casing and normally engaging said valve, said valve seats being concentric and facing toward said force-transmitting member, said second valve seat being the inner of said valve seats and having therein a space communicating with a source of pressure, said first chamber and said variable pressure chamber normally communicating with each other around said first valve seat, and manually operable means connected to said movable unit to move it in a direction away from said seats whereby said first valve seat will engage said valve and move it away from said second seat to admit pressure into said variable pressure chamber to operate said pressure-responsive unit.

8. A motor mechanism according to claim 7 wherein said bore and said pilot stem are relatively elongated whereby said movable unit is adapted to remain relatively stationary under the influence of pressure in said variable pressure chamber while said pressure-responsive unit moves axially a substantial distance, and a lost-motion connection between said pilot stem and said force-transmitting member whereby, upon a failure of said valve to admit pressure to said variable pressure chamber, said manually operable member will move said movable member to transmit force to said force-transmitting member.

9. A motor mechanism according to claim 7 wherein said first chamber is in fixed communication with a source of vacuum, the source of pressure connected to the space within said second valve seat being the atmosphere, said manually operable member being an axial push rod projecting through and of substantially smaller diameter than said second valve seat, and a compressible air cleaner engaging at one end against said casing adjacent said second valve seat and having engagement at its other end with said push rod.

10. A motor mechanism according to claim 7 wherein said portion of said movable unit and said diaphraghm form with the end of said casing opposite said first chamber a third chamber in fixed communication with said first chamber, said portion of said movable unit exposed to said variable pressure chamber being subject to differential pressures in said variable pressure and third chambers to oppose manual operation of said movable unit, and means comprising a spring biasing said diaphragm toward said variable pressure chamber and adapted to be compressed when pressure in said variable pressure chamber reaches a predetermined point to transmit a force to said movable unit to increase resistance to manual operation of said movable unit.

11. A motor mechanism according to claim 7 wherein said portion of said movable unit and said diaphragm form with the end of said casing opposite said first chamber a third chamber in fixed communication with said first chamber, an annular sealing diaphragm having one end sealed with relation to said movable unit and having its other end sealed to said casing adjacent said second valve seat, said portion of said movable unit exposed to said variable pressure chamber being subject to differential pressures in said variable pressure and third chambers to oppose manual operation of said movable unit, and means comprising a spring biasing said diaphragm toward said variable pressure chamber and adapted to be compressed when pressure in said variable pressure chamber reaches a predetermined point to transmit a force to said movable unit to increase resistance to manual operation of said movable unit.

12. A motor mechanism according to claim 7 wherein said portion of said movable unit and said diaphragm form with the end of said casing opposite said first chamber a third chamber in fixed communication with said first chamber, said portion of said movable unit exposed to said variable pressure chamber being subject to differential pressures in said variable pressure and third chambers to oppose manual operation of said movable unit, a pair of spring seats having limited movement away from each other, a spring arranged between said seats, one of said seats engaging said diaphragm in said third chamber to bias it towards said variable pressure chamber, said one seat having limited movement relative to said movable unit whereby, when pressure in said variable pressure chamber increases to a predetermined point, said spring will be compressed and said one seat will transmit force to said movable unit to increase resistance to manual operation thereof.

References Cited in the file of this patent
UNITED STATES PATENTS

| | | |
|---|---|---|
| 2,976,850 | Stelzer | Mar. 28, 1961 |
| 3,012,544 | Pulkownik | Dec. 12, 1961 |
| 3,044,449 | Price | July 17, 1962 |
| 3,067,727 | Ayers et al. | Dec. 11, 1962 |
| 3,075,499 | Prather | Jan. 29, 1963 |
| 3,076,441 | Ayers | Feb. 5, 1963 |
| 3,093,119 | Stelzer | June 11, 1963 |
| 3,113,489 | Cruse et al. | Dec. 10, 1963 |
| 3,115,067 | Ayers | Dec. 24, 1963 |